(12) United States Patent
Peng et al.

(10) Patent No.: US 12,453,358 B2
(45) Date of Patent: Oct. 28, 2025

(54) THEANINE-PRODUCING STRAIN AND USE THEREOF IN TEA FERMENTATION PRODUCTION

(71) Applicants: GUANGZHOU ZHONGZHUANG BEAUTY COSMETICS CO., LTD, Guangzhou (CN); HANGZHOU JIAJIALE BIOTECHNOLOGY CO., LTD, Hangzhou (CN)

(72) Inventors: Weihua Peng, Guangzhou (CN); Zeting Huang, Guangzhou (CN); Jie Xuan, Guangzhou (CN); Shunzhe Ji, Hangzhou (CN); Meng Zuo, Hangzhou (CN)

(73) Assignees: GUANGZHOU ZHONGZHUANG BEAUTY COSMETICS CO., LTD, Guangzhou (CN); HANGZHOU JIAJIALE BIOTECHNOLOGY CO., LTD, Hangzhou (CN)

(*) Notice: Subject to any disclaimer, the term of this patent is extended or adjusted under 35 U.S.C. 154(b) by 0 days.

(21) Appl. No.: 18/671,963

(22) Filed: May 22, 2024

(65) Prior Publication Data
US 2025/0287969 A1    Sep. 18, 2025

(30) Foreign Application Priority Data

Mar. 13, 2024   (CN) .......................... 202410285398.1

(51) Int. Cl.
*C12P 5/00* (2006.01)
*A23F 3/16* (2006.01)
(Continued)

(52) U.S. Cl.
CPC .............. *A23F 3/166* (2013.01); *C12N 1/205* (2021.05); *C12N 9/0016* (2013.01);
(Continued)

(58) Field of Classification Search
CPC ....... A23F 3/166; C12N 1/205; C12N 9/0016; C12N 9/1025; C12N 9/1096;
(Continued)

(56) References Cited

U.S. PATENT DOCUMENTS

2024/0052374 A1* 2/2024 Miller ................ C12N 15/8243

FOREIGN PATENT DOCUMENTS

| CN | 106636047 A | 5/2017 |
| CN | 109777763 A | 5/2019 |

(Continued)

OTHER PUBLICATIONS

Translation of Cheng et al. (CN 117126792). (Year: 2023).*
(Continued)

*Primary Examiner* — Brent T O'Hern

(57) ABSTRACT

Provided are a theanine-producing strain and use thereof in tea fermentation production. A *Corynebacterium glutamicum* is proposed, which includes an alanine decarboxylase CsAlaDC mutant. The theanine-producing strain is obtained by taking the *Corynebacterium glutamicum* as a starting strain, knocking out in sequence an α-ketoglutarate dehydrogenase E1 subunit gene odhA, a glutamate external transporter gene Ncgl1221 and a lactate dehydrogenase gene ldh; and/or expressing a citrate synthase gene gltA, a pyruvate kinase gene pyk and a glutamate dehydrogenase gene gdh; and/or overexpressing an alanine dehydrogenase alaA and integrating a γ-glutamine synthetase GMAS into a cg1960 pseudogene locus of the *Corynebacterium glutamicum*.

1 Claim, 2 Drawing Sheets
Specification includes a Sequence Listing.

(51) Int. Cl.
    *C12N 1/20* (2006.01)
    *C12N 9/00* (2006.01)
    *C12N 9/06* (2006.01)
    *C12N 9/10* (2006.01)
    *C12N 9/12* (2006.01)
    *C12N 9/88* (2006.01)
    *C12N 15/52* (2006.01)
    *C12N 15/77* (2006.01)
    *C12R 1/15* (2006.01)

(52) U.S. Cl.
    CPC ......... *C12N 9/1025* (2013.01); *C12N 9/1096* (2013.01); *C12N 9/1205* (2013.01); *C12N 9/88* (2013.01); *C12N 9/93* (2013.01); *C12N 15/52* (2013.01); *C12N 15/77* (2013.01); *C12Y 101/01027* (2013.01); *C12Y 102/04002* (2013.01); *C12Y 104/01002* (2013.01); *C12Y 203/03* (2013.01); *C12Y 206/01002* (2013.01); *C12Y 207/0104* (2013.01); *C12Y 401/01* (2013.01); *C12Y 603/01002* (2013.01); *C12N 2800/101* (2013.01); *C12R 2001/15* (2021.05)

(58) Field of Classification Search
    CPC .......... C12N 9/1205; C12N 9/88; C12N 9/93; C12N 15/52; C12N 15/77; C12N 2800/101; C12Y 101/01027; C12Y 102/04002; C12Y 104/01002; C12Y 203/03; C12Y 206/01002; C12Y 207/0104; C12Y 401/01; C12Y 603/01002; C12R 2001/15
    USPC .......................................................... 426/52
    See application file for complete search history.

(56) References Cited

FOREIGN PATENT DOCUMENTS

| CN | 117126792 A | * | 11/2023 |
| WO | 2005035752 A2 | | 4/2005 |
| WO | 2019165551 A1 | | 9/2019 |

OTHER PUBLICATIONS

Notification to Grant Patent Right for Invention, Chinese Application No. 202410285398.1, mailed Jul. 25, 2024 (3 pages).
CNIPA, Office Action issued for Chinese Application No. 202410285398.1, mailed Jul. 11, 2024 (13 pages).
Zhiwei Liu, "Study of Moleular Mechanimism of L-Theanine Metabolism in Tea Plant(*Camellia sinensis*)", Database, Aug. 15, 2020, D047-62, No. 8, China Doctoral Dissertation Full-text Database, Agricultural Science and Technology Series, China (74 pages).
Peixian Bai et al., Identification of a Novel Gene Encoding the Specialized Alanine Decarboxylase in Tea(*Camellia sinensis*) Plants, Database, Mar. 9, 2020, Accession No. QIH4 5886.1, GenPept database, US.

* cited by examiner

THEANINE-PRODUCING STRAIN AND USE THEREOF IN TEA FERMENTATION PRODUCTION

SEQUENCE LISTING

The instant application contains a Sequence Listing which has been submitted electronically in ST.26 format and is hereby incorporated by reference in its entirety. Said ST.26 copy, created on May 21, 2024, is named Sequence Listing.xml and is about 28,119 bytes in size.

TECHNICAL FIELD

The present disclosure relates to the technical field of fermentation, in particular to a theanine-producing strain (i.e., a strain used for generation of theanine) and a use thereof in tea fermentation production.

BACKGROUND

Theanine is the most abundant natural non-protein amino acid in tea. The research shows that, theanine is the main source of fresh and cool taste of tea, and it could cooperate together with glutamate and proline to weaken the bitter and astringent taste of tea soup and increase the fresh and cool taste of the tea soup. The theanine also has multiple physiological functions of preventing and treating nerve damage, inhibiting cancer cell invasion and migration, resisting depression and the like, and is widely applied to the fields of food and medicine. In tea, the theanine is mainly produced in the tea fermentation process. In the tea fermentation process, the microbial community utilizes precursor substances such as glutamate and ethylamine to synthesize the theanine, which accounts for more than 50% of the total free amino acids in the tea.

Industrial production methods of the theanine mainly include a plant separation and extraction method, a plant tissue cell culture method, a chemical synthesis method and a microbial method. The plant separation and extraction method and the plant tissue cell culture method are limited in scale due to high cost for producing the theanine; in addition, these methods use a large amount of chemical reagent in the separation process, which would easily result in environmental pollution, and thus the methods cannot be widely applied. Furthermore, D-type theanine and L-type theanine obtained by the chemical synthesis method need to be further resolved, which has a high separation cost, a low product yield, and many reaction byproducts. The microbial method is not limited by raw materials, and it has advantages of low cost, high catalytic efficiency, strong stereospecificity and the like. Thus, the microbial method has become the mainstream of industrial production of theanine, with great development potential.

CN 104407075A discloses a method for generating L-theanine by catalyzing L-glutamine and ethylamine by using recombinant *Bacillus subtilis* to secrete γ-glutamyl transpeptidase. The gene of γ-glutamyl transpeptidase (GGT) in the *Bacillus subtilis* is amplified and cloned into *Bacillus subtilis* 168 for overexpression, and the conversion rate of L-theanine reaches more than 86% by taking 80 mM L-glutamine as a donor and 640 mM ethylamine as a receptor. CN109777763B discloses a genetic engineering bacterium for de novo efficient synthesis of theanine using an inexpensive carbon source such as glucose as a substrate, which screens a novel efficient γ-glutamylmethylamine synthetase. It integrates a γ-glutamylmethylamine synthetase gene gmas-Mu, a glutamate dehydrogenase gene Cgl2079, a pyruvate carboxylase gene Cgl0689 and a citrate synthase gene gltA into an *E. coli* genome. The de novo synthesis of L-theanine from glucose was achieved. The highest yield of L-theanine reached 60 g/L and the conversion rate of sugar and acid reached 40% in the 5 L fermentation tank. CN114874959A discloses a genetic engineering bacterium for producing the L-theanine by de novo fermentation of glucose, which takes *Escherichia coli* as a starting strain and integrates a γ-glutamylmethylamine synthetase gene derived from Paracoccusaminovorans, a phosphoketolase gene, a transaminase gene, an acetaldehyde dehydrogenase gene and an alanine dehydrogenase gene respectively into the genome of *Escherichia coli* to construct a complete anabolic pathway from glucose to theanine. The theanine yield can reach 46 g/L after the strain is fermented for 33 h without adding ethylamine.

Studies have shown that the synthesis of theanine requires glutamate and ethylamine as a precursor, where the synthesis of ethylamine limiting the rate at which the theanine is produced. In tea plant cells, ethylamine is mainly generated from pyruvate conversion catalyzed by alanine decarboxylase. However, due to the low expression of alanine decarboxylase derived from plants in bacteria, the yield of theanine is often limited. And in the process of producing the theanine by adding the ethylamine in vitro, the ethylamine is easily harmful to human health after being gasified. Therefore, reducing the use of ethylamine, constructing a genetic engineering strain for de novo synthesis of theanine from glucose and improving the yield of theanine by genetic engineering means are the technical problems which need to be solved urgently at present.

SUMMARY

In order to solve the technical problems mentioned above, the present disclosure provides a theanine-producing strain and a use of the strain in tea fermentation production. In the present disclosure, pyruvate decarboxylase, which is the key enzyme limiting the rate at which the theanine is synthesized, is modified, and a strain conductive to high-yield of theanine is constructed, which enable de novo synthesis of the theanine from glucose without adding an exogenous precursor, thereby improving the yield of the theanine.

A first object of the present disclosure is to provide an alanine decarboxylase CsAlaDC mutant, and the alanine decarboxylase CsAlaDC mutant is mutated, on a basis of an original alanine decarboxylase as shown in sequence SEQ ID NO. 1, from isoleucine at a 177th position to tyrosine, and an amino acid sequence of the alanine decarboxylase CsAlaDC mutant is as shown in SEQ ID NO. 2.

A second object of the present disclosure is to provide a gene that encodes the alanine decarboxylase CsAlaDC mutant.

A third object of the present disclosure is to provide a recombinant vector including the gene.

A fourth object of the present disclosure is to provide a *Corynebacterium glutamicum* including the gene.

A fifth object of the present disclosure is to provide a theanine-producing strain, and the theanine-producing strain is obtained by taking the *Corynebacterium glutamicum* as a starting strain, knocking out in sequence an α-ketoglutarate dehydrogenase E1 subunit gene odhA, a glutamate external transporter protein gene Ncg11221, and a lactate dehydrogenase gene ldh, and overexpressing a citric acid synthase gene gltA, a pyruvate kinase gene pyk and a glutamate dehydrogenase gene gdh.

In an embodiment of the present disclosure, a sequence of the α-ketoglutarate dehydrogenase E1 subunit gene odhA is as shown in SEQ ID NO. 3. A sequence of the glutamic acid external transporter protein gene Ncgl1221 is as shown in SEQ ID NO. 4. A sequence of the lactate dehydrogenase gene ldh is as shown in SEQ ID NO. 5.

In an embodiment of the present disclosure, a sequence of the citric acid synthase gene gltA is as shown in SEQ ID NO. 6.

A sequence of the pyruvate kinase gene pyk is as shown in SEQ ID NO. 7.

A sequence of the glutamic acid dehydrogenase gene gdh is as shown in SEQ ID NO. 8.

An expression vector of the theanine-producing strain is plasmid pEC-XK99 or plasmid pXMJ19.

In an embodiment of the present disclosure, it further includes an overexpressed alanine dehydrogenase alaA that is, and a γ-glutamine synthetase GMAS is integrated into a cg1960 pseudogene locus of the *Corynebacterium glutamicum*.

In an embodiment of the present disclosure, a sequence of the alanine dehydrogenase alaA is as shown in SEQ ID NO.9.

A sequence of the γ-glutamine synthetase GMAS is illustrated in SEQ ID NO.10.

A sequence of the cg1960 pseudogene locus is as shown in SEQ ID NO.11.

The expression vector of the theanine-producing strain is the plasmid pXMJ19 or plasmid pEC-XK99.

In specific embodiments of the present disclosure, the theanine-producing strain is constructed by a method including the following steps:
taking *Corynebacterium glutamicum* including an alanine decarboxylase CsAlaDC mutant as a starting strain; knocking out an α-ketoglutarate dehydrogenase E1 subunit gene odhA, a glutamic acid external transporter protein gene Ncgl1221 and a lactate dehydrogenase gene ldh; and/or, expressing a citric acid synthase gene gltA, a pyruvate kinase gene pyk, and a glutamate dehydrogenase gene gdh; and/or, overexpressing an alanine dehydrogenase alaA, and integrating γ-glutamine synthetase GMAS into a cg1960 pseudogene locus of the *Corynebacterium glutamicum*.

A sixth object of the present disclosure is to provide use of the *Corynebacterium glutamicum* or the theanine-producing strain in producing the theanine through fermentation.

A seventh object of the present disclosure is to provide use of the *Corynebacterium glutamicum* or the theanine-producing strain in a tea fermentation process.

In an embodiment of the present disclosure, the tea fermentation process includes steps as follows.

In S1, the *Corynebacterium glutamicum* or the theanine-producing strain is inoculated into a seed culture medium, and a seed liquid is obtained through shaking culture; and the seed liquid is centrifuged and re-suspended to obtain a re-suspended thalli.

In S2, black tea is ground into powder, purified water is added thereto, and then heated and boiled; solid is separated from liquid, and filtrate is collected; the collected filtrate is filtered and sterilized to obtain a black tea extracting solution.

In S3, a solid phase obtained by precipitation of the re-suspended thalli obtained in S1 is added to the black tea extracting solution obtained in S2, and glucose and galactose are added for fermentation; a supernatant of the fermented liquid is taken, filtered and sterilized to obtain a black tea fermentation liquor.

In an embodiment of the present disclosure, in step S1, a formula of the seed culture medium is as follows: yeast powder at 1 g/L-50 g/L, peptone at 1 g/L-50 g/L, sodium chloride at 1 g/L-20 g/L, and glucose at 1 g/L-100 g/L.

The shaking culture is performed at a temperature of 15° C.-42° C. and a rotating speed of 50 rpm-300 rpm for 6 h-72 h.

In an embodiment of the present disclosure, in step S2, the heating is performed at a temperature of 30° C.-100° C. for 10 min-240 min.

In an embodiment of the present disclosure, in step S3, a final concentration of the glucose is 1 g/L-100 g/L; and a final concentration of the galactose is 0.1 g/L-20 g/L.

Compared with the prior arts, technical schemes of the present disclosure have the following advantages.

In the present disclosure, the alanine decarboxylase CsAlaDC carries out random mutation on a key enzyme CsAlaDC through error-prone PCR, and the mutant enzyme CsAlaDC-I177Y that enables synthesis of the theanine without adding the precursor substance ethylamine is obtained through screening, and the concentration of the theanine is improved by 85% compared with an original enzyme.

In the present disclosure, a *Corynebacterium glutamicum* AT-1 enabling high yield of glutamate is obtained by overexpressing pEC-XK99E-gltA-pyk-gdh vector. In addition, alanine decarboxylase CsAlaDC, which a key enzyme limiting the rate at which the L-theanine is synthesized, is mutated. Alanine dehydrogenase gene aldBsu derived from *Bacillus subtilis* is integrated, and the γ-glutamine synthetase GMAS is overexpressed. As such, a *Corynebacterium glutamicum* AT-2 enabling high yield of theanine is obtained. In this way, the technical problem of de novo synthesis of the L-theanine from glucose without adding extra ethylamine is broken through, and the yield of the theanine is improved, which further provides ideas for the production of the L-theanine.

In the present disclosure, after the obtained strain AT-2, which enables high efficient de novo synthesis of theanine from glucose is fermented for 48 h in a 5 L fermentation tank, the yield of the theanine may reach to 51.3 g/L.

When the strain obtained in the present disclosure is applied to black tea fermentation, a content of the theanine produced in the fermentation process of the black tea can be remarkably improved.

BRIEF DESCRIPTION OF THE SEVERAL VIEWS OF THE DRAWINGS

In order to make the contents of the present disclosure more clearly understood, the present disclosure is described in detail in the following according to specific embodiments of the present disclosure and with reference to the attached drawings.

DETAILED DESCRIPTION OF EMBODIMENTS

Figure 1:
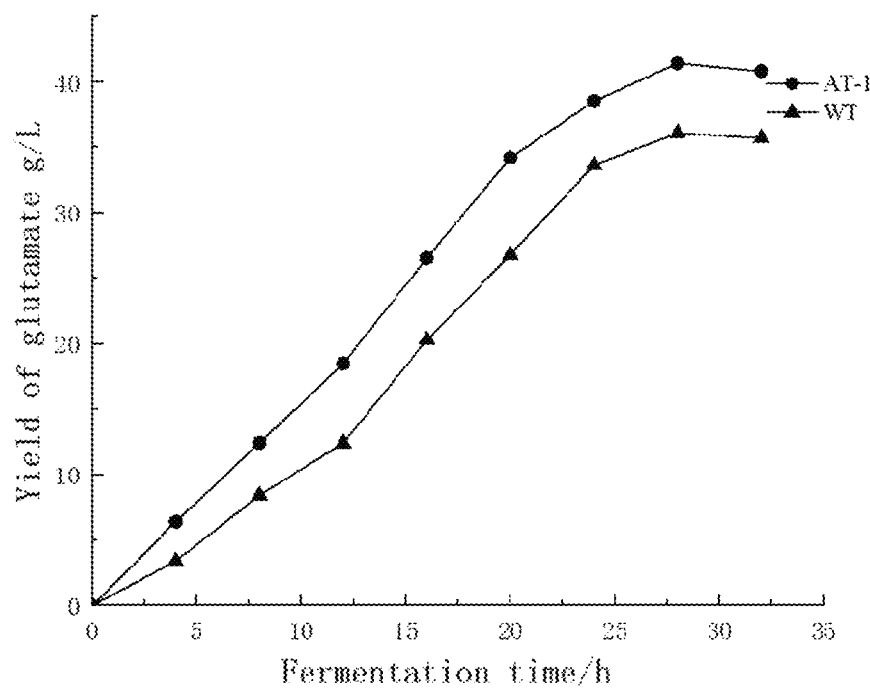
FIG. 1 is a diagram illustrating yield of glutamate in Example 8 of the present disclosure.
Figure 2:
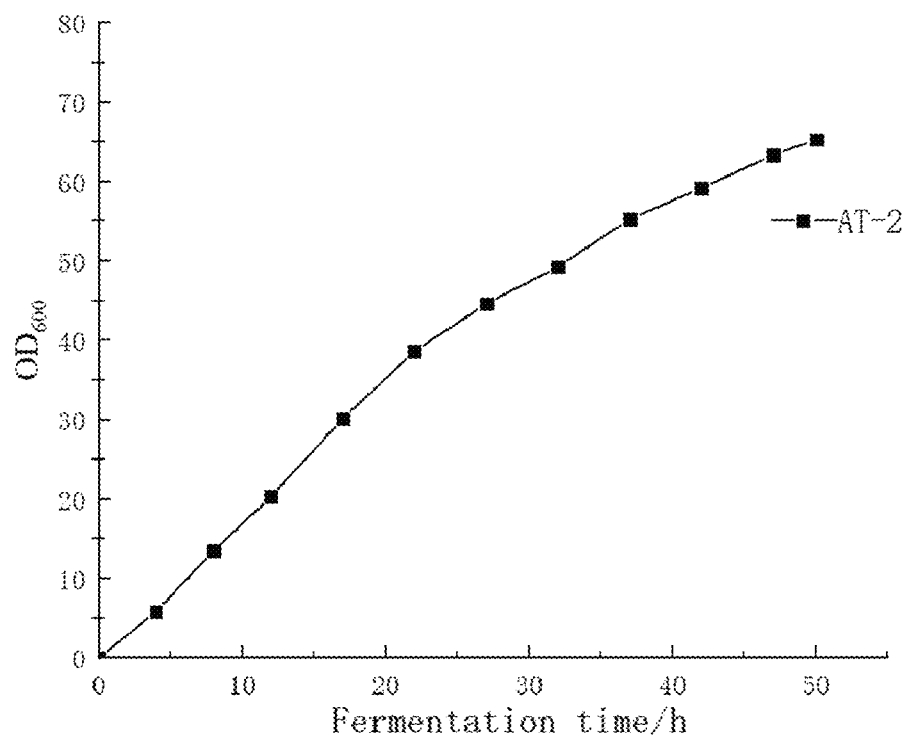
FIG. 2 illustrates a growth curve of AT-2 strain in Example 12 of the present disclosure.

The present invention is further described below in conjunction with the accompanying drawings and specific examples to enable those skilled in the art to better understand and practice the invention, but the examples are not intended to limit the invention.

In the present invention, the sources of pET28a and pK18mobsacB plasmids are not particularly limited, and a commercial product of the pET28a plasmid known to those skilled in the art may be used. In the invention, there is no special limitation on the conditions of the enzyme digestion reaction, and the enzyme digestion reaction conditions for HindIII, SalI, EcoRI and other enzymes well known to those skilled in the art may be adopted. In the invention, there is no special limitation on the conditions of the linking reactions and the conversion reactions, and the conditions of the enzyme linking reactions and conversion reactions well known to those skilled in the art may be adopted. In the present invention, the coating method is not particularly limited, and a coating method well known to those skilled in the art may be used.

Example 1: Detection Analysis of Theanine

The detection conditions for detecting the content of L-theanine using HPLC were as follows: Angilent1260; and Chromatographic column: HypersilODSC18 (4.0 mm×125 mm). Mobile Phase A (sodium acetate at 8 g/L, triethylamine at 225 L/L, tetrahydrofuran at 5 ml/L, and pH7.2; and mobile Phase B (in which sodium acetate solution has pH of 7.2 and a concentration of 30 g/L; gradient elution procedure of sodium acetate solution/acetonitrile/methanol (1:2:2, V/V) is as follows: when the retention time is 0, 27.5 min, 31.5 min, 34 min, 35 min or 40 min, the corresponding A/B (V/V) is 92:8, 40:60, 0:100, 0:100, 92:8 and 92:8, respectively. Flow rate: 1.0 mL/min. Ultraviolet detector. Detection wavelength: 338 nm. Column temperature: 40° C.

Example 2: Construction of Overexpressed pET28a-GMAS Recombinant *E. coli*

The codon of the GMAS derived from Methylovorusmays was optimized and then sent to Huada Gene for gene synthesis. Using the synthesized GMAS fragment as a template, the GMAS fragment (whose sequence is as shown in SEQ ID NO. 1) was amplified with P1/P2 primers. The PCR reaction was at conditions of: pre-denaturation at 95° C. for 3 min, denaturation at 95° C. for 15 s, annealing at 57° C. for 15 s, extension at 72° C. for 1 min, 30 cycles of such reaction, and extension at 70° C. for 5 min. A single restriction digest was performed on the pET28a plasmid using restriction endonucleases HindIII, to obtain a linearized plasmid. The PCR product was purified and recovered by using a gel recovery kit. The recovered GMAS fragment was homologously recombined and connected with the linearized plasmid pET28a, and transformed into *E. coli* DH5α competent cell, which was then uniformly coated on an LB plate with Kana (50 μg/mL) and incubated at 37° C. overnight to grow a single colony. PCR verification was performed on the single colony by using primers P3/P4, and the plasmid of the transformant obtained after the verification was extracted and transferred to *E. coli* BL21 competent cell. The selected single colone was transferred to 4 mL of LB+Kan50 liquid medium and cultured at 37° C. for 12 h, to obtain a BL21-GMAS recombinant strain. The sequences of primers involved are shown in Table 1.

TABLE 1

Sequences of used primers

| Primer name | Sequence of the primer (5'-3') |
|---|---|
| P1 | TCCGTCGACAAGCTTATGAAAAGCCTGGAAGAAGCCC |
| P2 | CTCGAGTGCGGCCGCATAGAACTGCACATAGCGATTAT |
| P3 | ATGCTAGTTATTGCTCAGCGG |
| P4 | CTCATGAGCGCTTGTTTCGG |

Example 3: Mutation of Alanine Decarboxylase CsAlaDC

Primers P5/P6 were designed, and the alanine decarboxylase CsAlaDC fragment was subjected to random mutation using error-prone PCR kit. The PCR reaction was at conditions of: pre-denaturation at 95° C. for 5 min, denaturation at 95° C. for 30 s, annealing at 60° C. for 30 s, extension at 72° C. for 30 s, 30 cycles, and final extension at 72° C. for 5 min.

A single restriction digest was performed on the pET28a plasmid using restriction endonucleases SalI to obtain a linearized plasmid. The PCR product was purified and recovered by using a gel recovery kit. The recovered CsAlaDC fragment was homologously recombined and connected with the linearized plasmid pET28a, and converted into competent cells of *Escherichia coli* BL21-GMAS recombinant strain, which was then uniformly coated on an LB plate with Kana (50 μg/mL), and cultured at 37° C. overnight to grow a single colony, to obtain a BL21-GMAS-CsAlaDC recombinant strain. The sequences of primers involved are shown in Table 2.

TABLE 2

Sequences of used primers

| Primer name | Sequence of the primer (5'-3') |
|---|---|
| P5 | TCGAGCTCCGTCGACATGGAAGGCACCGTGTCCGTGC |
| P6 | TGCGGCCGCAAGCTTCTTGTGCAGATCGCAATCGCAG |

Example 4: High Throughout Screening of Alanine Decarboxylase CsAlaDC Mutant Enzyme First, a BL21-GMAS-CsAlaDC recombinant single colony was selected and loaded onto a 96-well plate, added into a 800 μL LB medium, and cultured at 37° C. and 900 r/min for 6 h; thereafter, IPTG (isopropyl-3-D-thiogalactoside) at a final concentration of 0.1 mM was added, and cultured at 24° C. for 16 h. Into the 96-well plate, 0.1 mL glycerol, 200 μL potassium glutamate of 50 mM, 200 μL alanine of 50 mM, 50 μL ATP of 10 mM, 80 μL MgCl$_2$ of 5 mM, 85 μL DTT of 10 mM, and 85 μL Tris-HCl of 100 mM (pH 7.5) were sequentially added, to form a theanine synthesis system. The synthesis reaction was conducted for 24 h in a 30° C. water bath and repeated three times. After the synthetic reaction, each sample was added with ethanol having a volume of three times, to precipitate protein. After centrifugation at 12000 g for 20 min, a supernatant was obtained.

Example 5: Detection of Content of L-Theanine by Spectrophotometer

Color developing solution: 1.0 g/L soluble starch was weighed, mixed with distilled water, and boiling distilled water was added. Heating was performed while shaking, and the mixture was boiled for 2 min. After cooling, insoluble substances were filtered through a quantitative filter paper, and 1.0 g sodium hydroxide was added. After all the substances were dissolved through shaking, 1.0 g potassium iodide was added.

Sample preparation: 1 mL of the supernatant obtained in Example 4 was sucked, 5 mL HCl of 12 mol/L was added thereto, and then hydrolyzed at 80° C. for 5 h; thereafter, 60 mL NaOH solution of 1 mol/L was added to make 100 mL.

10 mL EP tubes were taken, 1 mL theanine sample and 4 mL sodium bicarbonate solution were added to one tube, and 5 mL sodium bicarbonate solution was added to the other tube, mixed and then stood for 5 min. Each of the tubes was added 1 mL sodium hypochlorite, and stood for 1 min. 1 mL sodium nitrite solution was added, mixed and then stood for 5 min. 0.5 mL developing solution was added, and finally 2.5 mL sodium bicarbonate solution of 6 wt % was added. Immediately after being mixed well, their absorbance values were respectively measured at the wavelength of 570 nm on the spectrophotometer by using distilled water as reference and with a cuvette. A high absorbance at 570 nm indicates a high theanine content.

By measuring the content of theanine in the synthetic system, the transformant corresponding to the high content of theanine was sent to Huada Company for sequencing. Sequencing results showed that the mutation point of the mutated enzyme catalyzing high amount of theanine in the synthesis was isoleucine at a 177th position which was mutated into tyrosine, and the mutated enzyme was named CsAlaDC-I177Y (whose amino acid sequence is as shown in SEQ ID NO. 3). The content of theanine catalyzed by the mutated CsAlaDC-I177Y was 93.6 μM, which was 85% higher than that of its original enzyme CsAlaDC (whose amino acid sequence is as shown in SEQ ID NO. 2).

Example 6: Construction of ΔodhAΔNcg11221Δldh Knockout Strain

1. Construction of pK18mobsacB-odhA Vector

The genome of *Corynebacterium glutamicum* ATCC13032 was used as a template, and odhA-L was obtained by PCR amplification using primers odhAL-F and odhAL-R in Table 3, and odhA-R was obtained by PCR amplification using odhAR-F and odhAR-R as primers.

The PCR reaction system of odhA-L was as follows: 2×Phanta MAX Buffer 25 μL, 1 μL dNTPMix (10 mM), 2 μL upstream primer odhAL-F and 2 μL downstream primer odhAL-R (10 mM), 0.5 μL template, and 1 μL Phanta MAX Super Fidelity DNA Polymerase, and sterile water was added to a final volume of 50 μL.

The PCR reaction system of odhA-R was as follows: 2×Phanta MAX Buffer 25 μL, 1 μL dNTPMix (10 mM), 2 μL upstream primer odhAR-F and 2 μL downstream primer odhAR-R (10 mM), 0.5 μL template, 1 μL Phanta MAX Super Fidelity DNA Polymerase, and sterile water was added to a final volume of 50 μL.

The PCR reactions were at conditions of: pre-denaturation at 95° C. for 3 min, denaturation at 95° C. for 15 s, annealing at 60° C. for 15 s, extension at 72° C. for 30 s, 30 cycles of such reaction, and extension at 70° C. for 5 min.

Using odhA-L and odhA-R as templates, odhA-LR was obtained by performing overlapping PCR amplification using the primers in Table 3.

The PCR reaction system was as follows: 2×Phanta MAX Buffer 25 μL, 1 μL dNTPMix (10 mM), 2 μL upstream primer odhAL-F and 2 μL downstream primer odhAR-R (10 mM), 1 μL template odhA-L and 1 μL template odhA-R, 1 μL Phanta MAX Super-Fidelity DNA Polymerase, and sterile water was added to a final volume of 50 μL.

The PCR reaction was at conditions of: pre-denaturation at 95° C. for 3 min, denaturation at 95° C. for 15 s, annealing at 60° C. for 15 s, extension at 72° C. for 30 s, 30 cycles of such reaction, and extension at 70° C. for 5 min.

The odhA-LR fragment obtained by amplification was recovered and ligated to the plasmid fragment pK18mobsacB treated with EcoRI restriction enzyme. The ligated products were transformed into *E. coli* DH5α competent cells, and then uniformly coated on a LB plate with Kana (25 μg/mL) and incubated overnight at 37° C. to select a single colony. Colony PCR verification was performed using P7/P8 primers. After sequencing and alignment, the odhA gene knockout vector pK18mobsacB-odhA was obtained, and the sequence of odhA was as shown in SEQ ID NO. 4.

TABLE 3

Sequences of used primers

| Primer name | Sequence of the primer (5'-3') |
|---|---|
| odhAL-F | CATGATTACGAATTCATGCTACAACTGGGGCTTAGGC |
| odhAL-R | AGTGGTCTGGGCCCTGGAGTTGTTCATGTCCGGGTGTA |
| odhAR-F | TGACATGAACAACTCCAGGGCCCAGACCACTCTTCC |
| odhAR-R | CCGGGTACCGAGCTCTTAAGCCTCGAAAGCCTCGTC |
| P7 | GAGTCAGTGAGCGAGGAAGCG |
| P8 | TCAGGCTGCGCAACTGTTG |

Among them, LB medium is consisted of: tryptone at 10.0 g/L, yeast extract at 5.0 g/L, NaCl at 10.0 g/L, which were dissolved in deionized water and a constant volume of 1.0 L was made, the pH was adjusted to 7.0-7.2, and agar powder of 1.5 wt % was added to the solid medium. It was sterilized at 121° C. for 20 min.

2. Construction of pK18mobsacB-Ncg11221 Vector

The genome of *Corynebacterium glutamicum* ATCC13032 was used as a template, Ncg11221-L was obtained by PCR amplification using primers Ncg11221L-F and Ncg11221L-R in Table 4, and Ncg11221-R was obtained by PCR amplification using Ncg11221R-F and Ncg11221R-F as primers. Then, Ncg11221-L and Ncg11221-R were used as templates, and Ncg11221-LR was obtained by performing overlapping PCR amplification using primers Ncg11221L-F and Ncg11221R-R.

The amplification PCR systems of Ncg11221-L, Ncg11221-R, and Ncg11221-LR were the same as the odhA fragment amplification systems in step 1, and are not described in detail, but the difference lied in that the PCR annealing temperature was 59° C.

The Ncg11221-LR fragment obtained by amplification was recovered and ligated to the plasmid fragment pK18 treated with EcoRI restriction enzyme. The ligated products were transformed into *E. coli* DH5α competent cells, and then uniformly coated on a LB plate with kanamycin Kan (25 μg/mL) and incubated overnight at 37° C. to select a single colony. Colony PCR verification was performed using P7/P8. After sequencing and alignment, the knockout vector pK18mobsacB-Ncg11221 was obtained. The primers were shown in Table 4, and the sequence of Ncg11221 was shown in SEQ ID NO. 5.

TABLE 4

Sequences of used primers

| Primer name | Sequence of the primer (5'-3') |
|---|---|
| Ncg11221L-F | CATGATTACGAATTCATGACTACAACCTTGACTCGCC |
| Ncg1122IL-R | GCAACCTCTGGAAAACGGTGTCTGCAAATCTGGACA |
| Ncg1122IR-F | GATTTGCAGACACCGTTTTCCAGAGGTTGCGGACC |
| Ncg1122IR-R | CGGGTACCGAGCTCTTATGCGTTTCGGTAGCGGAAG |
| P7 | GAGTCAGTGAGCGAGGAAGCG |
| P8 | TCAGGCTGCGCAACTGTTG |

3. Construction of pK18mobsacB-ldh Vector.

The genome of *Corynebacterium glutamicum* ATCC13032 was used as a template, ldh-L was obtained by PCR amplification using primers ldhL-F and ldhL-R in Table 5, and ldh-R was obtained by PCR amplification using ldhR-F and ldhR-R. Then, ldh-L and ldh-R were used as templates, and ldh-LR was obtained by performing overlapping PCR amplification using primers ldhL-F and ldhR-R.

The amplification PCR systems of ldhL, ldhR, and ldh-LR were the same as the odhA fragment amplification system, and are not described in detail here. The difference lies in that the PCR annealing temperature was 55° C.

The ldh-LR fragments obtained by amplification was recovered and ligated to the plasmid fragment pK18 treated with EcoRI restriction enzyme. The ligated products were transformed into *E. coli* DH5α competent cells, and then uniformly coated on an LB plate with kanamycin Kan (25 µg/mL) and incubated overnight at 37° C. to select a single colony. Colony PCR verification was performed using P7/P8. After sequencing and alignment, the knockout vector pK18mobsacB-ldh was obtained, and the sequence of ldh was shown in SEQ ID NO. 6.

TABLE 5

Sequences of used primers

| Primer name | Sequence of the primer (5'-3') |
|---|---|
| ldhL-F | CATGATTACGAATTCATGAAAGAAACCGTCGGTAACA |
| ldhL-R | AAATTTTCTCTAGACCTGTCCATGACATCGCCGACGA |
| ldhR-F | GATGTCATGGACAGGTCTAGAGAAAATTTTCGAAGAC |
| ldhR-R | CCGGGTACCGAGCTCTTAGAAGAACTGCTTCTGAATT |
| P7 | GAGTCAGTGAGCGAGGAAGCG |
| P8 | TCAGGCTGCGCAACTGTTG |

4. Construction of a ΔodhA Knockout Strain

The pK18mobsacB-odhA knockout vector was transformed into *C. glutamicum* competent cells through electroporation, cultured at 30° C. for 2-3 h, coated on a BHI plate with Kanr of 25 g/ml, and then cultured for 48 h, for a first round of PCR screening Positive transformants were selected and cultured in a BHI liquid culture medium with Kanr for 12 h. Thereafter, 100 µL bacterial solution was sucked and coated on a BHI non-resistant plate containing sucrose of 10 wt % for a second round of screening. Randomly selected transformants were subjected to PCR identification using primers P9/P10, to obtain an odhA gene-deficient strain ΔodhA, with the primers shown in Table 6.

BHI culture medium (g/L): 38.5 g brain-heart infusion broth powder, and 1.5%-2.0% agar was added to the solid medium.

5. Construction of ΔodhAΔNcg11221 Knockout Strain

The pK18mobsacB-Ncg11221 was transformed into the competent cells of the odhA gene-deficient strain ΔodhA through electroporation, cultured at 30° C. for 2-3 h and then coated on a plate with Kan of 25 g/mL, and then cultured for 48 h for a first round of PCR screening. Positive transformants were selected and cultured in a BHI liquid culture medium with Kanr for 12 h. Thereafter, 100 µL bacterial solution was sucked and coated on the BHI non-resistant plate containing 10% sucrose for the second round of screening. The randomly selected transformants were subjected to PCR identification using primers P11/P12, to obtain a ΔodhAΔNcg11221 knockout strain. The primers are shown in Table 6.

6. Construction of ΔodhAΔNcg11221Δldh Knockout Strain

The pK18mobsacB-ldh was transformed into the competent cells of the ΔodhAΔNcg11221 knockout strain through electroporation, cultured at 30° C. for 2-3 h and then coated on a BI plate with Kan of 25 g/mL, and then cultured for 48 h for a first round of PCR screening. Positive transformants were selected and cultured in a BHI liquid culture medium with Kanr for 12 h. Thereafter, 100 µL bacterial solution was sucked and coated on a BHI non-resistant plate containing 10% sucrose for the second round of screening. Randomly selected transformants were subjected to PCR identification using primers P13/P14, to obtain ΔodhAΔNcg11221Δldh knockout strain, with the primers shown in Table 6.

TABLE 6

Sequences of used primers

| Primer name | Sequence of the primer (5'-3') |
|---|---|
| P9 | ATGCTACAACTGGGGCTTAGGC |
| P10 | GACGAGGCTTTCGAGGCTTAA |
| P11 | ATGACTACAACCTTGACTCGCC |
| P12 | CTTCCGCTACCGAAACGCATAA |
| P13 | AATTCAGAAGCAGTTCTTCTAA |
| P14 | ATGAAAGAAACCGTCGGTAACA |

Example 7: Construction of Strain AT-1 Enabling High Yield of Glutamate

1. Construction of pEC-XK99E-gltA-pyk-gdh Vector

The plasmid pEC-XK99E was an *E. coli*-gluteal shuttle plasmid with a strong Ptrc promoter, which could be used to efficiently express endogenous genes. A wild-type *Corynebacterium glutamicum* ATCC13032 genome was use as a template, gltA-F and gltA-R were respectively used as upstream and downstream primers to amplify a citrate synthase gene gltA, pyk-F and pyk-R were used as upstream and downstream primers to amplify a pyruvate kinase gene pyk, and gdh-F and gdh-R were use as upstream and downstream primers to amplify a glutamate dehydrogenase gene gdh. The pEC-XK99E plasmid was linearized, a target gene was connected with the linearized pEC-XK99E plasmid in sequence and then transferred to *E. coli* DH5α competent cells. The constitutive expression plasmid pEC-XK99E-gltA-pyk-gdh was obtained after verification by PCR amplification. The primers were shown in Table 7, and the sequences of gltA, pyk and gdh were shown in SEQ ID NO. 7, SEQ ID NO. 8 and SEQ ID NO. 9 respectively.

2. Construction of ΔodhAΔNcg1122Δldh(pEC-XK99E-gltA-pyk-gdh) Strain

The plasmid pEC-XK99E-gltA-pyk-gdh was introduced into the ΔodhAΔNcg11221Δldh knockout strain obtained in Example 6 by electrotransfer, and ΔodhAΔNcg11221Δldh (pEC-XK99E-gltA-pyk-gdh) was obtain after PCR verification using primers P15/P16, which was named AT-1 strain, and the primers were shown in Table 7.

TABLE 7

Sequences of used primers

| Primer name | Sequence of the primer (5'-3') |
|---|---|
| gltA-F | ATGTTTGAAAGGGATATCGTGG |
| gltA-R | TTAGCGCTCCTCGCGAGGAACC |
| pyk-F | GTGGATAGACGAACTAAGATTG |
| pyk-R | TTAGAGCTTTGCAATCCTTGTG |
| gdh-F | ATGACAGTTGATGAGCAGGTC |
| gdh-R | TTAGATGACGCCCTGTGCCAGC |
| P15 | CCATGCAAATGCTGAATGAGGG |
| P16 | ATAGGCAGGATTGATGGGGATC |

Example 8: Fermentation of Strain AT-1 Enabling High Yield of Glutamate

Single colony of AT-1 was picked and inoculated into 10 mL BHI (with chloramphenicol resistance of 10 μg/mL) liquid culture medium, cultured overnight at 30° C. and 180 r/min, and then transferred at an inoculation amount of 1% to a 50 mL shake flask filled with 30 mL fermentation medium. After being cultured for 3 h, IPTG of 1 mmol/L was added for induction. Then, it was cultured at 30° C. and 180 r/min for 32 h, followed by centrifugation at 12000 rpm for 1 min to collect a supernatant. After induction, samples were taken once every 4 hours to separately determine the content of glutamate. The results are shown in FIG. 1.

Example 9: Detection of Content of Glutamate

The content of glutamate was determined by High Performance Liquid Chromatography HPLC. A standard curve was prepared by: accurately weighing 0.1000 g glutamate standard substance, diluting to a constant volume of 100 mL with distilled water, preparing a standard solutions of 1.0 g/L, diluting to different concentrations (0.1 g/L, 0.2 g/L, 0.4 g/L, 0.6 g/L, and 0.8 g/L), and mixing for later use. The concentration of the to be tested sample was diluted to about 0.5 g/L at the middle point of the curve, mixed evenly and passed through a membrane. The processed samples were sequenced, and subjected to pre-column derivation separation determination.

Mobile phase A: 6.24 g sodium phosphate dehydrate was weighed, transferred to a 1000 mL glass beaker, 1000 mL of ultra pure water was added, and mixed until all the crystals were completely dissolved; and the pH of the solution was adjusted to 7.80 with sodium hydroxide. Mobile phase B was that: acetonitrile:methanol:water=45:45:10 (V:V:V).

Chromatographic conditions: Chromatographic column ZORBAXEclipseAAA 4.6×75 mm3.5-micron, column temperature of 40° C., detection wavelength of 338 nm, flow rate of 2.0 mL/min, pre-OPA column derivation, mobile phase A, mobile phase B, and gradient elution was shown in Table 8.

TABLE 8

Gradient Elution Procedure

| step | Time/(min) | Flow rate/ (mL/min) | Mobile phase A (%) | Mobile phase B (%) |
|---|---|---|---|---|
| 1 | 0 | 2 | 100 | 0 |
| 2 | 1 | 2 | 100 | 0 |
| 3 | 9.8 | 2 | 43 | 57 |
| 4 | 10.0 | 2 | 0 | 100 |
| 5 | 12.5 | 2 | 100 | 0 |
| 6 | 14 | 2 | 100 | 0 |

As shown in FIG. 1, the accumulation of glutamate reached the maximum after 28 h of fermentation. The accumulation of glutamate in AT-1 strain was significantly higher than that of wild *Corynebacterium glutamicum*, with the maximum accumulation of 41.43 g/L, which is 14.7% higher than the maximum accumulation 36.1 g/L of wild *Corynebacterium glutamicum*.

Example 10: Construction of pXMJ19-alaA-CsAlaDC-I177V Vector

The plasmid pEC-XK99E was an *E. coli*-gluteal shuttle plasmid with a strong Ptac promoter, which could be used to efficiently express endogenous genes. A wild-type *Corynebacterium glutamicum* ATCC13032 genome was use as a template, alaA-F and alaA-R were used as upstream and downstream primers to amplify pyruvate transaminase gene alaA. The pXMJ19 plasmid was linearized by using restriction enzyme salI, and the alaA fragment was connected with the linearized pXMJ19 plasmid. The overexpression plasmid pXMJ19-alaA was obtained through verification by PCR amplification. The primers were shown in Table 9, and the sequence of alaA was shown in SEQ ID NO. 10.

Using pET28a-CsAlaDC-I177V as a template, primers PC1/PC2 were designed to amplify the CsAlaDC-I177V fragment to obtain the fragment CsAlaDC-I177V. The pXMJ19-alaA vector was subjected to single enzyme digestion with the restriction enzyme EcoRI, and the EcoRI enzyme digestion site was retained. The recovered pXMJ19-alaA single enzyme digestion fragment was connected with CsAlaDC-I177V through homologous recombination, transferred to *E. coli* DH5α competent cells, uniformly coated on an LB plate with chloramphenicol, and cultured overnight at 37° C. A single colony was selected, and subjected to colony PCR verification performed using primers PY1/PY2. After sequencing and alignment, the pXMJ19-alaA-CsAlaDC-I177V vector was obtained.

TABLE 9

Sequences of used primers

| Primer name | Sequence of the primer (5'-3') |
|---|---|
| alaA-F | GTGGGCGCGGATCAGGCAGC |
| alaA-R | CTACTGCTTGTAAGTGGACAG |

TABLE 9-continued

Sequences of used primers

| Primer name | Sequence of the primer (5'-3') |
|---|---|
| PC1 | ACCGAGCTCGAATTCATGGAAGGCACCGTGTCCGTGC |
| PC2 | CAAAACAGCCAAGCTCTTGTGCAGATCGCAATCGCAG |
| PY1 | TGCATAATTCGTGTCGCTCAAG |
| PY2 | ACTGAGCCTTTCGTTTTATTTG |

Example 11: Construction of AT-2 Strain Enabling High Yield of Theanine

1. Genomic Integration of γ-Glutamylmethylamine Synthetase GMAS

γ-glutamylmethylamine synthetase GMAS derived from methylotrophic bacteria was integrated into the genome of AT-1 strain constructed in Example 7, using pK18mobsacB plasmid-mediated *Corynebacterium glutamicum* genome editing. The pK18mobsacB plasmid was double-cleaved with XbaI and KpnI enzymes, and directly recovered to form a linear vector. The GMAS was integrated into the cg1960 pseudogene locus (whose sequence is as shown in SEQ ID NO. 11) of AT-1 strain. Using the ATCC13032 genome as a template, primers cg1960-UF and cg1960-UR were designed to amplify the upstream homologous arms by PCR, and primers cg1960-DF and cg1960-DR were used to amplify the downstream homologous arms by PCR, so as to obtain cg1960-U fragment and CG1960-D fragment. The sequences of the primers are as shown in Table 10.

The γ-glutamylmethylamine synthetase GMAS derived from methylotrophic bacteria was sent to Huada for gene synthesis after codon optimization. Using the synthetic gene as a template, primers GMAS-F and GMAS-R were designed for PCR amplification of the GMAS gene. Using PXMJ19 as a template, the Ptac promoter (whose sequence is as shown in SEQ ID NO. 12) was amplified using Ptac-F and Ptac-R primers, where the designed primers carried adjacent gene homologous regions. After DNA purification and recovery, the upstream homologous arm fragment cg1960-U, the Ptac promoter fragment, the GMAS gene fragment, and the downstream homologous arm fragment cg1960-D were subjected to overlapping PCR by using primers cg1960-UF and cg1960-UR, and purification and recovery were performed after verification by agarose gel electrophoresis, to obtain an overlapping fragment cg1960::GMAS. cg1960::GMAS was then subjected to homologous recombination with a pK18mobsacB linear vector, and transformed into *Escherichia coli* DH5a competent cells, and then coated on a chloramphenicol plate for culture. Colony PCR verification was performed using primers cg1960-UF and cg1960-DR, and the pK18mobsacB::GMAS plasmid was obtained. The pK18mobsacB::GMAS plasmid was electrically converted into the competent cells of the AT-1 strain prepared in advance (the pK18mobsacB::GMAS plasmid integrated GMAS into the cg1960 locus), and coated on a chloramphenicol plate for culture until a single colony was grown. The primers used for identification were cg1960-Y1 and cg1960-Y2, the size of the gel electrophoresis band was 2885 bp, and the correct colony was connected to a shaking tube for bacterial preservation. The AT-1::GMAS strain was obtained. The specific primers are shown in Table 10.

TABLE 10

Sequences of used primers

| Primer name | Sequence of the primer (5'-3') |
|---|---|
| cg1960-UF | CAGGTCGACTCTAGAACAATATTTTCACGGTAGCAAC |
| cg1960-UR | AACAGCTCATTTCAGCAGAGATACTTTGGCATGTTTTTGA |
| cg1960-DF | GTGGCGGGTGCTTAAGTGCTTGATGAGTCAAAGAAGT |
| cg1960-DR | ATTCGAGCTCGGTACCGACTGAGGTGATCTTGTTGAAT |
| GMAS-F | TAAAGGAGGACAACCATGAAAAGCCTGGAAGAAGCCC |
| GMAS-R | ATAGAACTGCACATAGCGATTA |
| Ptac-F | CTGAAATGAGCTGTTGACAA |
| Ptac-R | TTCCAGGCTTTTCATGGTTGTCCTCCTTTAAGCTTA |
| cg1960-Y1 | AAACATCTATTGATCCGATCACCAT |
| cg1960-Y2 | GTTGCCACTGTGTGTAGATCTTGAT |

2. Acquisition of AT-2 Strain

The pXMJ19-alaA-CsAlaDC-I177V carrier was transferred into AT-1::GMAS competent cells, coated on a BHI plate with chloramphenicol resistance, and cultured at 30° C. for 24 h. A single colony was picked up and PCR verification was performed using the primers PY1/PY2 to obtain AT-2 strain.

Example 12: Fermentation of AT-2 Strain for Production of Theanine

1. Fermentation Method with a Fermentation Tank

A single colony of AT-2 was selected and transferred to a BHI (with chloramphenicol resistance of 10 μg/mL) liquid culture medium, and cultured overnight at 30° C. and 180 r/min to obtain a primary seed liquid. Then, the primary seed liquid was transferred at an inoculation amount of 5% to a 500 mL shake flask filled with 100 mL fermentation medium, and cultured under the same conditions for 12 h to obtain a secondary seed liquid. They were all transferred to a 5 L fermentation tank containing 1.8 L of fermentation medium. The fermentation conditions were as follows: fermenting at 30° C. in the early stage, heating to 32° C. after 10 h (when OD600 was about 30° C.), then increasing by 2° C. at every 2 h, and finally fermenting at a constant temperature after the temperature was increased to 37° C.; a rotation speed of 600 r/min, a ventilation volume of 4 vvm, and pH of 7.0 (controlled by adding 50 vt % ammonia). When the glucose concentration dropped to about 20 g/L, glucose solution at 80 wt % was added. After fermentation for 12 h, when OD600 was about 20, IPTG with final concentration of 1 mmol/L was added for induction, and samples were taken once every 5 h after induction to determine the content of theanine, and the fermentation was performed for 48 h.

Figure 3:
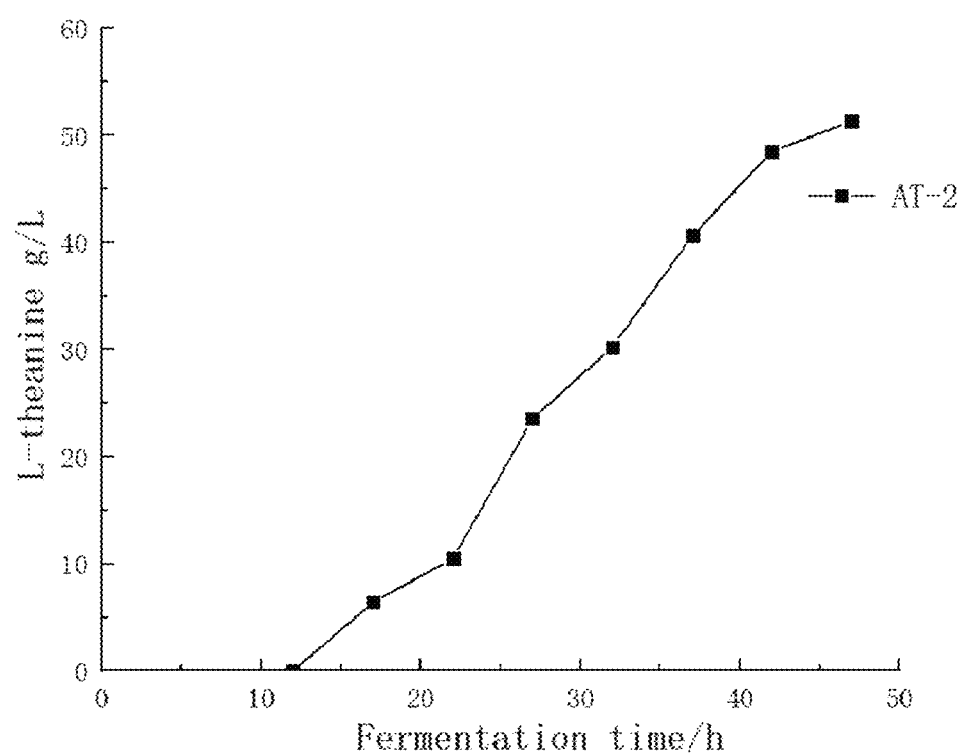
FIG. 3 is a diagram illustrating yield of theanine in Example 12 of the present disclosure.

As shown in FIG. 3, through the de novo synthesis of theanine by the AT-2 strain from glucose without adding ethylamine, the yield of extracellular theanine reached 51.3 g/L after 48 h fermentation.

Example 13: Fermentation of Black Tea with AT-2 Strain Enabling High Yield of Theanine (1) Thallus activation: 20 μL AT-2 strain was sucked from the bacterial retention tube and added into a BHI shaking tube, and cultured in the 32° C. shaking table for 12 h-14 h to obtain a solution containing activated thalli.

(2) Seed liquid culture: the activated strain was inoculated into 10 mL LBG medium and cultured in an oscillating shaker at 30° C. and 200 rpm for 24 h. The formula of the LBG culture medium is as follow: yeast powder at 5 g/L, peptone at 10 g/L, sodium chloride at 10 g/L, and glucose at 10 g/L.

(3) Preparation of black tea extracting solution: 10 g black tea was ground into powder, 100 g purified water was added, and the mixture was boiled over slow fire for 30 min at 70° C., centrifuged, and the filtrate was collected. The black tea extracting solution was filtered and sterilized using a filtering membrane of 0.22 μm.

(4) Black tea fermentation: after all the obtained seed liquid was centrifuged, the obtained thallus precipitate was washed with sterile water and repeated for three times. After the re-suspended thalli were precipitated, they were added to the obtained black tea extracting solution, and the sterilized glucose with a final concentration of 10 g/L and sterilized galactose with a final concentration of 2 g/L were added into the extracting solution for shaking culture at 30° C. for 24 h.

(5) After the fermentation was finished, it was centrifuged to obtain a supernatant, and the black tea fermentation liquor was further filtered and sterilized by using a filtering membrane of 0.22 μm, to obtain the black tea fermentation liquor.

(6) The contents of theanine in the black tea extracting solution and the finally obtained black tea fermentation liquor were measured, respectively, and the results are shown in Table 11.

TABLE 11

| Determination of contents of theanine | |
| --- | --- |
|  | Theanine (g/L) |
| Black tea extracting solution | 0.5 |
| Black tea fermentation liquor | 2.7 |

According to the invention, the AT-2 strain enabling high yield of theanine is applied to black tea fermentation, the content of the theanine in the black tea fermentation process can be remarkably improved; and compared with a sample which is not subjected to fermentation, the content of the theanine was improved by 4.4 times.

Test Example 1: Test of Anti-Wrinkle Index of Fermented Black Tea

Test of anti-wrinkle index of fibroblasts: fibroblasts were set with a blank control group, a model group, a positive control group and a sample group. The number of cells per well was controlled to be $5\times10^5$. After incubation at 37° C. for 24 h in a 5% CO2 incubator, the medium was removed and a small amount of PBS (pH of 7.4) was added to just cover the cells. The cells were stimulated with UVA at the UV radiation dose of 7 $J/cm^2$, and the blank control group was not radiated. PBS was discarded, samples with different concentrations were added, with the addition concentration of the black tea fermentation liquor being 6%, VC being 80 g/ml, and GSH being 20 m/ml; and the cells were stimulated for 24 h. The cell culture supernatants were centrifuged for 15 min at 4° C. and 1000 g, and the supernatants were tested for MMP-1 content using human matrix metalloproteinase-1 (MMP-1) ELISA Kit. The cell suspension was diluted with PBS (pH of 7.2-7.4) to obtain a cell concentration of $1\times10^6$ cells/mL, and the cells were ruptured after repeated freeze-thaw treatment. The cells were centrifuged at 1000 g for 20 min to obtain the supernatant, which was used to test the CoLI content using a type I collagen (CoLI) test box, and test the HA content using human hyaluronic acid (HA) ELISA Kit. All operations were conducted in accordance with the kit instructions.

The test results of anti-wrinkle indexes of the black tea fermentation liquor using the AT-2 strain are shown in Table 12. The black tea fermentation liquor tended to weaken the expression of MMP-1 in fibroblasts, enhance the expression of CoL I, and significantly increase the HA content in fibroblasts damaged by UVA radiation.

TABLE 12

| Anti-wrinkle effect of black tea fermentation liquor using AT-2 strain | | | |
| --- | --- | --- | --- |
|  | MMP-1 content | CoL I content | HA content |
| Blank group | 20.56 | 5.12 | 4.89 |
| Model group | 20.90 | 3.85 | 3.56 |
| GSH | 21.17 | 6.89 | 5.45 |
| VC | 20.42 | 2.45 | 4.38 |
| Black tea fermentation liquor | 19.89 | 7.12 | 6.67 |

It should be understood that the above examples are merely examples for clear illustration and are not intended to limit the embodiments. For those skilled in the art, various other changes and modifications may also be made from the foregoing description. It is not necessary to exhaust all embodiments. And obvious changes or modifications can be made therefrom without departing from the scope of protection of the present invention.

What is claimed is:

1. A *Corynebacterium glutamicum* comprising an alanine decarboxylase CsAlaDC mutant, wherein an amino acid sequence of the alanine decarboxylase CsAlaDC mutant is mutated, on a basis of an original alanine decarboxylase with an amino acid sequence as shown in SEQ ID NO. 1, from isoleucine at a 177th position into tyrosine, and an amino acid sequence of the alanine decarboxylase CsAlaDC mutant is as shown in SEQ ID NO. 2.

* * * * *

SEQUENCE LISTING

```
Sequence total quantity: 12
SEQ ID NO: 1           moltype = DNA  length = 1332
FEATURE                Location/Qualifiers
source                 1..1332
                       mol_type = genomic DNA
                       organism = unidentified
SEQUENCE: 1
atgaaaagcc tggaagaagc ccagaaattc ctggaagatc atcatgttaa atatgtgctg  60
gcccagtttg tggatattca tggtgttgca aaagttaaaa gcgttccggc aagccatctg 120
aatgatattc tgaccaccgg tgcaggtttt gccggtggtg caatttgggg caccggtatt 180
gcaccgaatg gtccggatta tatggcaatt ggtgaactga gcaccctgag cctgattccg 240
tggcagcctg gttatgcacg tctggtttgt gatggtcatg ttaatggtaa accgtatgaa 300
tttgatacccc gtgttgttct gaaacagcag attgcccgtc tggcagaaaa aggttggacc 360
```

-continued

```
ctgtataccg gtctggaacc ggaatttagc ctgctgaaaa aggatgaaca tggtgcagtt    420
catccgtttg atgatagcga tacccctgca aaaccgtgct atgattataa aggtattacc    480
cgtcatagcc cgtttctgga aaaactgacc gaaagcctgg ttgaagttgg tctggatatt    540
tatcagatcg atcatgaaga tgccaacggc cagtttgaaa tcaattatac ctatgccgat    600
tgcctgaaaa gcgcagatga ttacatcatg tttaaaatgg cagcaagcga aattgccaat    660
gaactgggta ttatttgtag ctttatgccg aaaccgttta gcaatcgtcc tggtaatggt    720
atgcacatgc atatgagcat tggtgatggt aaaaagtccc tgtttcagga tgatagtgat    780
ccgagcggtc tgggtctgag caaactggca tatcattttc ttggtggtat tctggcacat    840
gcaccggcac tggcagcagt ttgtgcaccg accgttaata gttataaacg tctggtggtt    900
ggtcgtagcc tgagcggtgc aacctgggca ccagcatata ttgcatatgg taataacaat    960
cgtagcaccc tggttcgtat tccgtatggt cgtctggaac tgcgtctgcc ggatggtagc   1020
tgtaatccgt atctggcaac cgcagcagtt attgcagcag tctggatgg tgtggcacgt   1080
gaactggatc ctggcaccgg tcgtgatgat aatctgtatg attattcact ggaacagctg   1140
gccgaatttg gtattggcat tctgccgcag aacctgggta agcactggga tgcactggaa   1200
gcagatcagg ttattatgga tgcaatgggc ccgggtctgt caaaagaatt tgttgaactg   1260
aaacgcatgg aatgggttga ttatatgcgt catgttagcg attgggaaat taatcgctat   1320
gtgcagttct at                                                       1332

SEQ ID NO: 2              moltype = AA  length = 478
FEATURE                   Location/Qualifiers
source                    1..478
                          mol_type = protein
                          organism = unidentified
SEQUENCE: 2
MEGTVSVLSN VSKVELLSKC FDLITIPVEP LPPVVASNGV AGGETKKMKE KDIVLGKNVH     60
TTSLTITEPD VDDDSTSDME AFMAGVLVRY RKTLIEKTKY HLGYPFNLDL DYGPLAELQH    120
FAINNLGDPF IESNYGVHSR QFEVGVLDWF ARLWEIEQKE YWGYITNGGT EGNLHGILVG    180
REVFPDGIFY TSRESHYSIF KAARMYRMEC VKVGTLINGE IDCADFKAKL LSNKDKPAII    240
NLNIGTTVKG AVDDIDLVIQ TLEECGFSHD RFYIHCDGAL FGFMMPFLNR GPKITFKKPI    300
GSVSVSGHKF MGCPTPCGVQ ITRLEHINAL SRNVEYLASR DATITGSRNG HSPIILWYAL    360
NRKGFKGFQK EVQKCLRNAH YLKDRLREAG ISAMLNELSS TVVFERPLDE EFVRRWQLAC    420
EGNMAHVIVM PNVTIEKLDE FLNELVQKRA NWYNDGKAGP PCLAPDIGSE NCDCDLHK     478

SEQ ID NO: 3              moltype = AA  length = 478
FEATURE                   Location/Qualifiers
source                    1..478
                          mol_type = protein
                          organism = unidentified
SEQUENCE: 3
MEGTVSVLSN VSKVELLSKC FDLITIPVEP LPPVVASNGV AGGETKKMKE KDIVLGKNVH     60
TTSLTITEPD VDDDSTSDME AFMAGVLVRY RKTLIEKTKY HLGYPFNLDL DYGPLAELQH    120
FAINNLGDPF IESNYGVHSR QFEVGVLDWF ARLWEIEQKE YWGYITNGGT EGNLHGILVG    180
REVFPDGIFY TSRESHYSIF KAARMYRMEC VKVGTLINGE IDCADFKAKL LSNKDKPAII    240
NLNIGTTVKG AVDDIDLVIQ TLEECGFSHD RFYIHCDGAL FGFMMPFLNR GPKITFKKPI    300
GSVSVSGHKF MGCPTPCGVQ ITRLEHINAL SRNVEYLASR DATITGSRNG HSPIILWYAL    360
NRKGFKGFQK EVQKCLRNAH YLKDRLREAG ISAMLNELSS TVVFERPLDE EFVRRWQLAC    420
EGNMAHVIVM PNVTIEKLDE FLNELVQKRA NWYNDGKAGP PCLAPDIGSE NCDCDLHK     478

SEQ ID NO: 4              moltype = DNA  length = 3774
FEATURE                   Location/Qualifiers
source                    1..3774
                          mol_type = genomic DNA
                          organism = unidentified
SEQUENCE: 4
atgctacaac tggggcttag gcataatcag ccaacgacca acgttacagt ggataaaaca     60
aagctcaata aaccctcaag aagcaaggaa aagaggcgag tacctgccgt gagcagcgct    120
agtactttcg gccagaatgc gtggctggta gacgagatgt ccagcagtt ccagaaggac    180
cccagtccg tggacaagga atggagagaa ctctttgagg cgcaggggg accaaatact    240
accccgcta caacagaagc acagccttca gcgcccaagg agtcgcgaa accagcacca    300
aaggctgccc ctgcagccaa ggcagcaccg cgcgtagaaa ccaagccgg cgacaagacc    360
gcccctaagg ccaaggagtc ctcagtgcca cagcaaccta gcttccgga gccaggacaa    420
accccaatca gggtatttt caagtccatc gcgaagaaca tggatatctc cctgaaaatc    480
ccaaccgcaa ccctcggttc gatatgcca gctcgcctca tgttcgaaaa ccgcgcgatg    540
gtcaacgatc agctcaagcg caccgcggt ggcaagatct ccttcacca catcattgag    600
tacgccatgg tgaaggcagt catggctcac ccggacatga caactccta cgacgtcatc    660
gacggcaagc caaccctgat cgtgcctgag cacatcaacc tgggcttgc tatcgacctt    720
cctcagagg acggctccg cgcacttgtc gtagcagcca tcaaggaaac cgagaagatg    780
aacttctccg agttcctcgc agcctacgaa gacatcgtgg cacgctcccg caagggcaag    840
ctcaccatgg atgactacca ggcgttacc gttccttga caacccagg tggcatcgt    900
accccgcact ctgttccacg tctaaccaag ggccagggca ccatcatcgg tgtcggttcc    960
atggattacc cagcagagtt ccagggcgct tcagaagacc gccttgcaga gctcggcgtt   1020
ggcaaacttg tcaccatcac ctccacctac gatcaccgcg tgatccaggg tgctgtgtcc   1080
ggtgaattcc tgcgcaccat gtctcgcctg ctcaccgatg attccttctg ggatgagatc   1140
ttcgacgcaa tgaacgttcc ttacaccca atgcgttggg cacgagcgt tccaaacact   1200
ggtgttgata gaacacccg cgtcatgcag ctcattgagg catacgctc ccgtggacac   1260
ctcatcgctg acaccaaccc actttcatgg gttcagcctg gcatgccagt tccagaccac   1320
cgcgacctcg acatcgagac ccacaacctg accatctggg atctggaccg taccttcaac   1380
gtcggtggct cgcggcgaa ggagaccatg accctgcgcg aggtactgtc ccgcctccgc   1440
gctgcgtaca ccctcaaggt cggctccgaa tacacccaca tcctgaccg cgacgagcgc   1500
```

```
acctggctgc aggaccgcct cgaggccgga atgccaaagc caacccaggc agagcagaag   1560
tacatcctgc agaagctgaa cgccgcggag gctttcgaga acttcctgca gaccaagtac   1620
gtcggccaga agcgcttctc cctcgaaggt gcagaagcac ttatcccact gatggactcc   1680
gccatcgaca ccgccgcagg ccaaggcctc gacgaagttg tcatcggtat gccacaccgt   1740
ggtcgcctca acgtgctgtt caacatcgtg ggcaagcact tggcatccat cttcaacgag   1800
tttgaaggcc aaatggagca gggccagatc ggtggctccg gtgacgtgaa gtaccacctc   1860
ggttccgaag gccagcacct gcagatgttc ggcgacggcg agatcaaggt ctccctgact   1920
gctaacccgt cccacctgga agctgttaac ccagtgatgg aaggtatcgt ccgcgcaaag   1980
caggactacc tggacaaggg cgtagacggc aagactgttg tgccactgct gctccacggt   2040
gacgctgcat tcgcaggcct gggcatcgtg ccagaaacca tcaacctggc taagctgcgt   2100
ggctacgacg tcggcggcac catccacatc gtggtgaaca accagatcgg cttcaccacc   2160
accccagact ccagccgctc catgcactac gcaaccgact acgccaaggc attcggctgc   2220
ccagtcttcc acgtcaacgg cgacgaccca gaggcagttg tctgggttgg ccagctggcc   2280
accgatacc gtcgtcgctt cggcaaggac gtcttcatcg acctcgttcg ctaccgcctc   2340
cgcggccaca acgaagctga tgatccttcc atgacccagc caaagatgta tgagctcatc   2400
accggccgcg agaccgttcg tgctcagtac accgaagacc tgctcggacg tggagacctc   2460
tccaacgaag atgcagaagc agtcgtccgc gacttccacg accagatgga atctgtgttc   2520
aacgaagtca aggaaggcgg caagaagcag gctgaggcac agaccggcat caccggctcc   2580
cagaagcttc cacacggcct tgagaccaac atctcccgtg aagagctcct ggaactggga   2640
caggctttcg ccaacacccc agaaggcttc aactaccacc cacgtgtggc tcccgttgct   2700
aagaagcgcg tctcctctgt caccgaaggt ggcatcgact gggcatgggg cgagctcctc   2760
gccttcggtt ccctggctaa tccggccgc ttggttcgcc ttgcaggtga agattcccgc   2820
cgcggtacct tcacccagcg ccacgcagtt gccatcgaac cagcgaccgc tgaagagttc   2880
aacccactcc acgagcttgc acagtccaag ggcaacaacg gtaagttcct ggtctacaac   2940
tccgcactga ccgagtacgc aggcatgggc ttcgagtacg ctactccgt aggaaacgaa   3000
gactccatcg ttgcatggga agcacagttc ggcgacttcg ccaacggcac tcagaccatc   3060
atcgatgagt acgtctcctc aggcgaagct aagtgggggcc agacctccaa gctgatccttc   3120
ctgctgcctc acggctacga aggccagggc ccagaccact cttccgcacg tatcgagcgc   3180
ttcctgcagc tgtgcgctga gggttccatg actgttgctc agccatccac cccagcaaac   3240
cacttccacc tactgcgtcg tcacgctctg tccgacctga acgtccact ggttatcttc   3300
accccgaagt ccatgctgcg taacaaggct gctgcctccg caccagaaga cttcactgag   3360
gtcaccaagt tccagtccgt gatcaacgat ccaaacgttg cagatgcagc caaggtgaag   3420
aaggtcatgc tggtctccgg caagctgtac tacgaattgg caaagcgcaa ggagaaggac   3480
ggacgcgacg acatcgcgat cgttcgtatc gaaatgctcc acccaattcc gttcaacgac   3540
atctccgagg ctcttgccgg ctaccctaac gctgaggaag tcctcttcgt tcaggatgag   3600
ccagcaaacc agggcccatg gccgttctac caggagcacc tcccagagct gatcccgaac   3660
atgccaaaga tgcgccgcgt ttcccgccgc gctcagtcct ccaccgcaac tggtgttgcc   3720
aaggtgcacc agctggagga gaagcagctt atcgacgagg ctttcgaggc ttaa          3774

SEQ ID NO: 5           moltype = DNA  length = 771
FEATURE                Location/Qualifiers
source                 1..771
                       mol_type = genomic DNA
                       organism = unidentified
SEQUENCE: 5
atgactacaa ccttgactcg ccccaaaatc gcgctgcccg cgcgcatcta ttcaccgctt    60
gcggtgcttg ttttctggca gctcggctcg agcctgggca ccatcccgga gcggattctg   120
ccggcaccaa ccacgatctt ggccgccagc tgggaggtcg ccacaaatgg cacgcttctc   180
gacgccctcc tcgtctcaag ccaacgcgtc cttctaggct tcgccctcgg tgctgtccta   240
ggcatttccc taggtgtatt gacaggcatg tccagatttg cagacaccgc cgttgatccg   300
ctcattcaag ctgcccgcgc gctgcctcac ctgggtcttg tcgcgtcgtt tatcatctgg   360
ttcggtatcg gtgagctgcc gaaagtactg attattagcc tcggcgtgct gtatccgctg   420
tacctcaaca ccgccagcgg gttcaggcaa attgatccaa agcttctgga agccggccac   480
gtgatgggct tcggattttt ccagaggttg cggaccatca tcattccttc tgccgcgccg   540
caacttttg tcggcctgcg ccaagcaagt gcggccgcct ggctctcact gatcgtggcg   600
gaacaggtca acgcccgcga aggactcggc ttcctcatca acaatgcgcg cgattttac   660
cgcaccgacc tcgttatttt cggcctcatt gtctacgcca gcctcggtct gctgtctgaa   720
gcgctgatca gagcttggga acgtcacacc ttccgctacc gaaacgcata a             771

SEQ ID NO: 6           moltype = DNA  length = 945
FEATURE                Location/Qualifiers
source                 1..945
                       mol_type = genomic DNA
                       organism = unidentified
SEQUENCE: 6
atgaaagaaa ccgtcggtaa caagattgtc ctcattggcg caggagatgt tggagttgca    60
tacgcatacg cactgatcaa ccagggcatg gcagatcacc ttgcgatcat cgacatcgat   120
gaaaagaaac tcgaaggcaa cgtcatggac ttaaaccatg tgttgtgtg ggccgattcc   180
cgcacccgcg tcaccaaggg cacctacgct gactgcgaag acgcagccat ggttgtcatt   240
tgtgccggcg cagcccaaaa gccaggcgag acccgcctcc agctggtgga caaaaactgc   300
aagattatga aatccatcgt cggcgatgtc atggacagcg gattcgacgg catcttcctc   360
gtggcgtcca cccagtggga tatcctgacc tacgcagtgt ggaaattctc cggcttgaa   420
tggaaccgcg tgatcggctc cggaactgtc ctggactccg ctcgattccg ctacatgctg   480
ggcaactct acgaagttgc acaagctctc tccacaagcc acatcatcgg agacaacggc   540
gacactgaac ttccagtcct gtcctccgcg accatcgcag gcgtatcgct tagccgaatg   600
ctggacaaag acccagagct tgagggccgt ctagagaaaa ttttcgaaga cacccgcgac   660
gctgcctatc acattatcga cgccaagggc tccacttcct acggcatcgg catgggtctt   720
gctcgcatca ccgcgcaat cctgcagaac caagacgttg cagtcccagt ctctgcactg   780
ctccacggtg aatacggtga ggaagacatc tacatcggca ccccagctgt ggtgaaccgc   840
```

```
cgaggcatcc gccgcgttgt cgaactagaa atcaccgacc acgagatgga acgcttcaag    900
cattccgcaa atacccctgcg cgaaattcag aagcagttct tctaa                    945
```

| SEQ ID NO: 7 | moltype = DNA   length = 1314 |
|---|---|
| FEATURE | Location/Qualifiers |
| source | 1..1314 |
| | mol_type = genomic DNA |
| | organism = unidentified |

SEQUENCE: 7
```
atgtttgaaa gggatatcgt ggctactgat aacaacaagg ctgtcctgca ctaccccggt     60
ggcgagttcg aaatggacat catcgaggct tctgagggta acaacggtgt tgtcctgggc    120
aagatgctgt ctgagactgg actgatcact tttgacccag ttatgtgag cactggctcc     180
accgagtcga agatcaccta catcgatggc gatgcggaa tcctgcgtta ccgcggctat     240
gacatcgctg atctggctga gaatgccacc ttcaacgagg tttcttacct acttatcgaa    300
ggtgagctac caaccccaga tgagcttcac aagtttaacg acgagattcg ccaccacacc    360
cttctggacg aggacttcaa gtcccagttc aacgtgttcc cacgcgacgc tcacccaatg    420
gcaaccttgg cttcctcggt taacatttg tctacctact accaggacca gctgaaccca    480
ctcgatgagg cacagcttga taaggcaacc gttcgcctca tggcaaaggt tccaatgctg    540
gctgcgtacg cacaccgcgc acgcaagggt gctccttaca tgtacccaga caactccctc    600
aatgcgcgtg agaacttcct gcgcatgatg ttcgttacc caaccgagcc atacgagatc     660
gacccaatca tggtcaaggc tctggacaag ctgctcatcc tgcacgctga ccacgagcag    720
aactgctcca cctccaccgt tcgtatgatc ggttccgcac aggcaaacat gttttgtctcc   780
atcgctggtg gcatcaacgc tctgtccggc ccactgcacg gtggcgcaaa ccaggctgtt    840
ctggagatgc tcgaagacat caagagcaac acggtggcg acgcaaccga gttcatgaac    900
aaggtcaaga caaggaaga cggcgtccgc tcatgggct cggacaccg cgtttacaag      960
aactacgatc cacgtgcagc aatcgtcaag gagaccgaca gcgagatctc cgagcacctc   1020
ggtggcgacg atcttctgga tctggcaatc aagctggaag aaattgcact ggctgatgat   1080
tacttcatct cccgcaagct ctaccgaac gtagactcct acaccggcct gatctaccgc   1140
gcaatgggct tccaactga cttcttcacc gtattgttcg caatcggtcg tctgccagga   1200
tggatcgctc actaccgcga gcagctcggt gcagcaggca acaagatcaa ccgcccacgc   1260
caggtctaca ccggcaacga atcccgcaag ttggttcctc gcgaggagcg ctaa         1314
```

| SEQ ID NO: 8 | moltype = DNA   length = 1428 |
|---|---|
| FEATURE | Location/Qualifiers |
| source | 1..1428 |
| | mol_type = genomic DNA |
| | organism = unidentified |

SEQUENCE: 8
```
gtggatagac gaactaagat tgtatgtacc ctaggcccag cggtggctag tgcagatgga     60
attctgcgtt tggtagaaga cggcatggat gttgctcgcc tcaacttctc ccatggtgac    120
cacccagatc atgagcaaaa ctacaagtgg gtccgcgagg cggcggagaa gactggccgt    180
gcagtcggta ttctcgcaga cctccaagga ccgaagatcg tcttggccg tttcactgac    240
ggcgcaaccg tgtgggaaaa cggcgagacc attcggatca ccgttgacga tgtagaggga    300
acgcacgatc gtgtgtccac cacctacaag aatctggcaa aagacgcgaa gccaggcgac    360
cgcctgctcg ttgatgacgg caaggttggc ctcgtctgcg tttccgtcga aggtaacgac    420
gtcatctgtg aggttgttga gggcggacca gtctccaaca caaggggtgt tccccctgcca   480
ggtatgata tttcctgtacc tgcactgtcc gaaaaggata tccgtgacct gcgcttcgcc    540
ctgaagctcg gcgtggactt tattgcactg tccttcgtac gttccccagc agatgctgaa    600
ctcgttcaca agatcatgga cgaagaaggt cgtcgtgttc ctgtgatcgc caagctggaa    660
aagccagagg ctgtcacctc cctcgagcca atcgtgttgg cattcgacgc cgtcatggtt    720
gctcgtgatg acctcggcgt tgaggttcct ctggaggagg ttccactggt tcagaagcga    780
gcaatccaga ttgcccgtga aacgcaaaa ccagttatcg tggcaaccca gatgctggat    840
tccatgattg agaactcccg cccaacccgt gcggaagctt ctgacgtggc aaacgctgtg    900
ctcgatggcg cagatgctgt catgctttct ggtgaaactt cagtgggcaa agatccgcac    960
aacgttgtgc gcaccatgtc tcgcattgtt cgcttcgctg aaaccgacgg tcgcgtccca   1020
gacctgaccc acatccctcg cactaagcgt ggcgttattt cctactctgc acgtgatatc   1080
gccgagcgcc tcaacgctcg tgcattggtt gcgttcacca cctctggtga taccgcaaag   1140
cgtgtggctc gtctgcacag ccacctgcca ctgctcgtgt tcactccaaa tgaggcagtt   1200
cgctctgagc tggcgctgac ctgggtgcaa accaccttcc tgtgtccacc tgtcagcgat   1260
accgatgaca tgatgcgcga agtcgaccgt gctctttag caatgcctga gtacaacaag   1320
ggtgacatga tggttgttgt tgcaggttcc cctcctggtg ttaccggtaa caccaacatg   1380
attcacgtcc accttcttgg tgacgacaca aggattgcaa agctctaa                1428
```

| SEQ ID NO: 9 | moltype = DNA   length = 1344 |
|---|---|
| FEATURE | Location/Qualifiers |
| source | 1..1344 |
| | mol_type = genomic DNA |
| | organism = unidentified |

SEQUENCE: 9
```
atgacagttg atgagcaggt ctctaactat tacgacatgc ttctgaagcg caatgctggc     60
gagcctgaat tcaccaggc agtggcagag gttttggaat ctttgaagat cgtcctggaa    120
aaggaccctc attacgctga ttacggtctc atccagcgcc tgtgcgagcc tgagcgtcag    180
ctcatcttcc gtgtgccttg ggttgatgac cagggccagg tccacgtcaa ccgtggtttc    240
cgcgtgcagt tcaactctgc acttggacca tacaaggcg gcctgcgctt ccacccatcc    300
gtaaacctgg gcattgtgaa gttcctgggc tttgagcaga tctttaaaaa ctccctaacc    360
ggcctgccaa tcgtggtgg caagggtgga tccgacttcg accctaaggg caagtccgat    420
ctggaaatca tgcgtttctg ccagtccttc atgaccgagc tacaccgcca catcggtgag    480
taccgcgacg ttcctgcagg tgacatcgga gttggtggcg cgagatcgg ttacctgttt    540
ggccactacc gtcgcatggc taaccagcac gagtccggcg ttttgaccgg taagggcctg    600
```

```
acctggggtg gatccctggt ccgcaccgag gcaactggct acggctgcgt ttacttcgtg   660
agtgaaatga tcaaggctaa gggcgagagc atcagcggcc agaagatcat cgtttccggt   720
tccggcaacg tagcaaccta cgcgattgaa aaggctcagg aactcggcgc aaccgttatt   780
ggtttctccg attccagcgg ttgggttcat accctaacg gcgttgacgt ggctaagctc   840
cgcgaaatca aggaagttcg tcgcgcacgc gtatccgtgt agccgacga agttgaaggc   900
gcaacctacc acaccgacgg ttccatctgg gatctcaagt gcgatatcgc tcttccttgt   960
gcaactcaga acgagctcaa cggcgagaac gctaagactc ttgcagacaa cggctgccgt  1020
ttcgttgctg aaggcgcgaa catgccttcc acccctgagg ctgttgaggt cttccgtgag  1080
cgcgacatcc gcttcggacc aggcaaggca gctaacgctg gtggcgttgc aacctccgct  1140
ctggagatgc agcagaacgc ttcgcgcgat tcctggagct tcgagtacac cgacgagcgc  1200
ctccaggtga tcatgaagaa catcttcaag acctgtgcag agaccgcagc agagtatgga  1260
cacgagaacg attacgttgt cggcgctaac attgctggct tcaagaaggt agctgacgcg  1320
atgctggcac agggcgtcat ctaa                                         1344

SEQ ID NO: 10           moltype = DNA  length = 1260
FEATURE                 Location/Qualifiers
source                  1..1260
                        mol_type = genomic DNA
                        organism = unidentified
SEQUENCE: 10
gtgggcgcgg atcaggcagc gcgtcccact cggcgaacaa ctcgccgcat cttcgatcag    60
tcggagaaga tgaaggacgt gctgtacgac atccgtcgc cggtggccgc ggaggcggaa   120
cgcatggagc ttgatgggca taacatctta aagctcaaca cgggaaatcc agccgtgttc   180
ggattcgatg cccccgacgt gattatgcgt gacatgatcg ccaaccttcc aacttcccaa   240
gggtattcca cctccaaagg cattattccg gcccggcgag cagtggtcac ccgctacgaa   300
gttgtcccg gattccccca cttcgatgtt gatgatgtgt tcttaggcaa cggtgtctca   360
gaactaatca ccatgaccac ccaagcactc ctcaacgacg gcgatgaagt tcttatcccc   420
gcaccggact acccactgtg gactgccgca acctccctgg ctggtggtaa gcctgtgcac   480
tacctctgtg atgaggaaga tgactggaac ccatccatcg aagacatcaa gtccaaaatc   540
tcagagaaaa ccaaagctat tgtggtgatc aacccaacac accccacggg agctgtctac   600
ccgcgccggg tgttggaaca aatcgtcgag attgcacgcg agcatgacct gctgattttg   660
gccgatgaaa tctacgaccg cattctctac gatgatgccg agcacatcag cctggcaacc   720
cttgcaccag atctcctttg catcacatac aacggtctat ccaaggcata ccgcgtcgca   780
ggataccgag ctggctggat ggtattgact ggaccaaagc aatacgcag tggatttatt   840
gagggcctcg aactcctcgc aggcactcga ctctgcccaa atgtccagc tcagcacgct   900
attcaggtag ctctcggtgg acgccagtcc atctacgacc tcactggcga acacggccga   960
ctcctggaac agcgcaacat ggcatggacg aaactcaacg aaatcccagg tgtcagctgt  1020
gtgaaaccaa tgggagctct atacgcgttc cccaagtccg accccaacgt gtacgaaatc  1080
cacgacgaca cccaactcat gctggatctt ctccgtgacg agaaaatcct catggttcag  1140
ggcactggct tcaactggcc acatcacgat cacttccgag tggtcaccct gccatgggca  1200
tcccagttgg aaaacgcaat tgagcgcctg ggtaacttcc tgtccactta caagcagtag  1260

SEQ ID NO: 11           moltype = DNA  length = 3792
FEATURE                 Location/Qualifiers
source                  1..3792
                        mol_type = genomic DNA
                        organism = unidentified
SEQUENCE: 11
atgtccgctc caaccatcta cccggcacc aaaacatcta ttgatccgat caccatggat    60
gacgctcgca tcatctttt cgatattgag tcgctccaca atattttcac ggtagcaacc   120
tacgattctc tgtcccacca cgtcgatgtc ttttacctgc tcgatcacac aaccagcct   180
cagatcacgg tgctgccgca ctcaatggat tatttcgatc aaacgcgcag cgatgctgtt   240
atggctgcca tcattgagca aaaccctgcg ttccagaaaa ttaaaggctc acccattaca   300
accgcagatg tagcccctcca caatctcggt gacaccaacg ccaaccgacg ctggcagtct   360
aacgtgctgc ttgcccggct actcgggggt attagtgtgc gcggagaggt acctgagcac   420
cagagccaca accatctcgc caagcagttt gccgaggcaa ccttggtcac cagggacttc   480
gatgtgaatt atgatccaac aagcgctcac cctttactg ctggcttcaa ctcgatcaac   540
tatgacacca ccttgctcag cctgtacttc gcaatgttga cctcaaatat cggaagtaca   600
ccgacgtatt tcccggtgat caccgcacag gaacttcgtg cgcataacga caagctcttt   660
agccctgagt tcatcaaaaa catgccaaag tatctctgga atcgcgacag cggtgctgga   720
ctcagagctg catcgggttt ccgcaacgcc atgctcaaat cgggtcgcca cattgatatt   780
caacgcctca atgaaaaaca gctctttgtt ggactcaagc gcctgcttgg tctcctcggt   840
caccagattc tcgaatctga tcgtctctct ggtgatgatg cccatgttga tactaacgag   900
gatgtacttg atctcattgc ctacaacgtc tcagacgttg tgggcaccag actgctcgct   960
gaggacccgg tgtactccgg ctcttttgat ctgcgggcag gtctactgag cacctaccca  1020
gagactgttt ttgatcatga tggtactttc cgtcagccat ccacgcagat gcgtaaagat  1080
cgcctaacga ttaatacctc atcagctcag ttcgcagcgc gtattttggc gccatatcgc  1140
ccactccgcg atgtccctga tgcgattggc gacatgccgg tggtgtctta cttgtacccg  1200
gatgcagcag tcgccgaagc aacaggtcaa aaacaagtca cgtgcttga tgactcaaag  1260
aagttcttct atgacaacat caccgacccg gaagcacgtg ctgcctttga tgaggtcttt  1320
gcttttacg ctgatattga gggtcgcaac ttcaacagtc acaatgaggc tattgatacc  1380
cagattaacc aattacgtgc ttatctcaac caggttgtcg cattcgatgc agctgggtat  1440
gcgctctatg atgtacgtac acgttttgag cagatcttcc ccaaggatcg cagctacatc  1500
aacgatgcta cggatatgac ccctcgcgca gtatccgagct ttgacgatct ggttgcactc  1560
tgtgatgata ttcgcggtgt acttgatcga ggtttagaga tctcatctcc gaatcatcat  1620
gagatggtgg atgctatgcg caagcagctg cactatattc aggcatttta ccgtgcctgg  1680
ggacccattc aacgccgctt caatgacgct gacccagcgg tgacccatcc gcatctcaca  1740
gtgatctacc caccgctcac ccctgcatcc gcagagaat tcaacaagat cacctcagtc  1800
gctgctgtga gcaagcgccc aaccaccctg ccgtatttcc gtgcagatgg ttcacctact  1860
```

```
cgtggctttg ctaacttctc cacaggaggt attcacggtg cggaatacaa cgaagatcgt    1920
tttgaccatg atcaagatct acacacagtg gcaacccgtg aattcttcgc cattcttgat    1980
gcgacattag cggctctcta cgcagcccac caagccgaac ctgaatcggc ggactaccag    2040
attgcacaag acgcactcgc ctgggcaaag aatgtactta gcgatcaaaa actcatcgct    2100
aagtcgcctc agttatacaa ccccgaaacc ggggtcacct atgagtggga gtttgtcgct    2160
caagcagcat ggtggattcg caacaaaccg gttgaggtta ttttaccaac aggtgaatca    2220
atgaccgtaa aacacaaatc tgtattggca tctgcgtcct acccactccg agacaacgtg    2280
gcgtactggc gtagcgaacc caaaacacca cagctgtttc ccgtagcaaa atctggtggt    2340
tcctcgcttg agaagaagta caactacacc tctgtgggta ctgctattca cgaggacttt    2400
agcagttact atccgctctt gctcaccaat atggctgcat ttaccaatgc tgacttaggt    2460
attgatgaga aaaccgggcg ccctcgtgac cgctaccgtg aaatctacga acaaaaagag    2520
atctatggcg cacagcgcaa agaccctcc attgatgaag aaacaaagca acgtctaggg     2580
attttgcgcg aaggtaccaa gttgattctt aactcggcca ccggtgctgc tgatgctggt    2640
cacgacaccc cgatcctcat gaacaatcgc gttattgcca tgaggattat tgggcagcta    2700
ttttcttgga gaattgggca agctcaatca ctggctggtg caacgattat ttccactaac    2760
actgatggcc tgtattccgt actcgatatg gggactaacc agcgcgttct tgatgaacac    2820
gctacagcca tcggtgtgca aattgagcct gaagaactgg atattgtctc caaggattcc    2880
aactcacgtg ccgaatttct cggcaatggc tacatcaatg cggccggtga cttggcgtgt    2940
tgggatggac ccaactctcg gaactcacta gatcacccgg cctttgttga ccatgtgctg    3000
gtgaagtatt tccagctcgt cgtcaacaac actgtgccag agattccaga acacctgag    3060
cttgagggt taccgctggc tcttgatcaa cccatgaacc gccacgaagt ctcgaagatt    3120
gtcgccacta tgcacaagga attcgagccg aaaaagctgc tgtcgtttta ccaaaacatt    3180
ttggcctctt cacgcggttc taataccttc ctattctctg tccctatat ccctgcaaca    3240
gaaggagaag aaacccaccc tgcaacagat accagcacta ttgcgacacc aaccttgagc    3300
tttgatgctt atggtaataa ggccgaggtc atgccgactc aatccactgt ggataagcgc    3360
gtgccctctt tgctgcagta ttacacgcgt acattccatg tgcgacaaga tacgcagcag    3420
gctgtctttg atgttattgg cgccaacccc gtgctcatcg ccgcagcaaa agctgcatcc    3480
atatcaccgg cttctgctga ttcacgtaga aagaagggcc tggcctccac caacgctgac    3540
ccagtagcca agcatgtact agaaattgca ggagctgatg tggaatcgct gcgccatgaa    3600
aaggatctca aggtcaccaa gcacactggc caagacccag cactgcctgt cgtggtcttt    3660
aaccaaacca tttggcataa ccccaacgac gatgtgatta atgcattact gggcgctatt    3720
gaccaggatg cctacattga catggcgatc tcgtcctaca acaagtcctg gcacaacatt    3780
atcccggctt aa                                                        3792

SEQ ID NO: 12       moltype = DNA  length = 88
FEATURE             Location/Qualifiers
source              1..88
                    mol_type = genomic DNA
                    organism = unidentified
SEQUENCE: 12
ctgaaatgag ctgttgacaa ttaatcatcg gctcgtataa tgtgtggaat tgtgagcgga    60
taacaattaa gcttaaagga ggacaacc                                       88
```